United States Patent [19]

Hegner et al.

[11] Patent Number: 5,076,147
[45] Date of Patent: Dec. 31, 1991

[54] PRESSURE SENSOR INCLUDING A DIAPHRAGM HAVING A PROTECTIVE LAYER THEREON

[75] Inventors: Frank Hegner; Manfred Frank, both of Maulburg, Fed. Rep. of Germany

[73] Assignee: Endress u. Hauser GmbH u. Co., Fed. Rep. of Germany

[21] Appl. No.: 499,615

[22] Filed: Mar. 26, 1990

[30] Foreign Application Priority Data

Apr. 13, 1989 [DE] Fed. Rep. of Germany ....... 3912217

[51] Int. Cl.⁵ ............................................. F01B 19/00
[52] U.S. Cl. ............................ 92/103 SD; 92/103 M; 73/715; 73/717; 73/723; 73/721
[58] Field of Search ................... 92/98 R, 103 R, 47, 92/103 SD, 103 M; 73/715, 717, 718, 723, 724, 725, 728

[56] References Cited

U.S. PATENT DOCUMENTS

| | | |
|---|---|---|
| 3,753,196 | 8/1973 | Kurtz et al. |
| 4,320,664 | 3/1982 | Rehn et al. ............................ 73/721 |
| 4,382,247 | 5/1983 | Stecher et al. |
| 4,725,345 | 2/1988 | Sakamoto et al. ............. 92/103 SD |
| 4,737,756 | 4/1988 | Bowman |
| 4,772,513 | 9/1988 | Sakamoto et al. ............. 92/103 SD |
| 4,798,089 | 1/1989 | Frick et al. ............................ 73/715 |
| 4,838,088 | 6/1989 | Murakami |
| 4,858,557 | 8/1989 | Pozzetti et al. ................ 92/103 SD |
| 4,905,575 | 3/1990 | Knecht et al. ......................... 73/721 |
| 4,932,265 | 6/1990 | Skuratoysky et al. ................ 73/721 |

FOREIGN PATENT DOCUMENTS

| | | |
|---|---|---|
| 2938205 | 4/1981 | Fed. Rep. of Germany . |
| 3008572 | 9/1981 | Fed. Rep. of Germany . |
| 3723561 | 1/1988 | Fed. Rep. of Germany . |
| 2059071 | 4/1981 | United Kingdom . |

OTHER PUBLICATIONS

Roempps Chemie-Lexikon, 1987, pp. 3850-3853, Otto-Albrecht, Neumueller, Germany.

Primary Examiner—John T. Kwon
Assistant Examiner—Thomas Denion
Attorney, Agent, or Firm—Barnes & Thornburg

[57] ABSTRACT

The pressure sensor consists of a substrate and a diaphragm joined together around the periphery so as to form a chamber. The surface of the diaphragm facing away from the substrate is exposed to a medium whose pressure is to be measured. To protect the diaphragm against corrosion or abrasion, the diaphragm surface exposed to the medium is covered with a layer of silicon carbide, preferably by chemical vapor deposition.

16 Claims, 1 Drawing Sheet

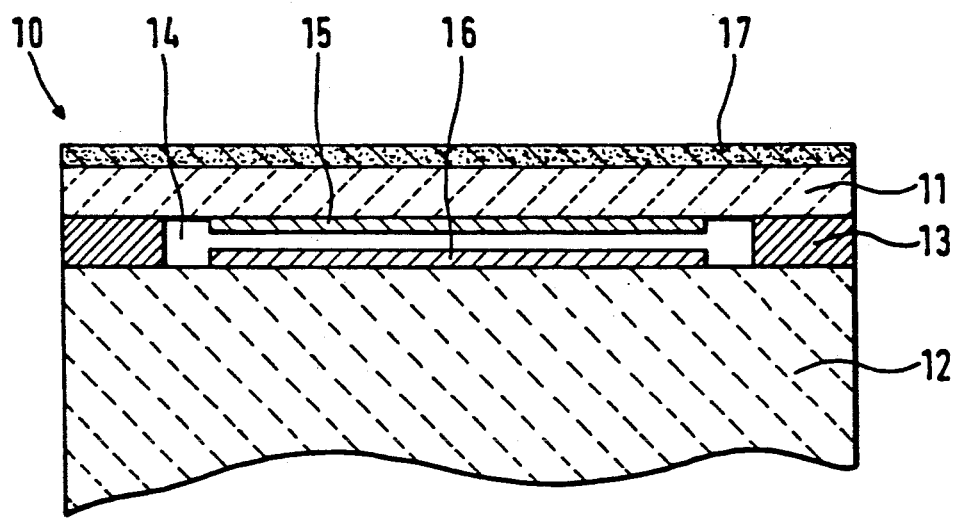

PRESSURE SENSOR INCLUDING A DIAPHRAGM HAVING A PROTECTIVE LAYER THEREON

BACKGROUND AND SUMMARY OF THE INVENTION

The present invention relates to a pressure sensor comprising a diaphragm which is joined around the periphery to a substrate so as to form a chamber, and whose surface facing away from the substrate is exposed to a medium whose pressure is to be measured.

In pressure sensors of this kind, the diaphragm is preferably made from a low-cost spring material suitable for economical mass production, such as ceramic, glass, quartz, single-crystal material, or base metals. A material especially suited for the diaphragm is oxide ceramic, particularly alumina ceramic. The diaphragm materials used must meet very different requirements which relate to the following aspects in particular:

1. the desired elastic qualities, such as creep strength, hysteresis-free operation, etc.;
2. the technique used to join the diaphragm to the substrate, such as soldering, welding, fusion by glass frit, or the like;
3. the resistance to influences of the medium whose pressure is to be measured, particularly corrosion and abrasion resistance.

There is practically no diaphragm material which meets all these requirements. Depending on the predominant requirements in the various applications, pressure sensors with different diaphragm materials must therefore be made available, which adds to manufacturing and warehousing costs. With respect to the other requirements, trade-offs usually have to be made.

It is the object of the invention to provide a pressure sensor of the above kind which, having a diaphragm made from any of the conventional low-cost spring materials, which can be selected with regard to the desired elastic qualities and the joining technique used, can be mass-produced in an economical manner, the diaphragm have a high resistance to influences of the medium whose pressure is to be measured, particularly to corrosion and abrasion.

To accomplish this, according to the invention, a layer of silicon carbide is applied to the surface of the diaphragm facing away from the substrate.

The silicon-carbide layer applied to the diaphragm in accordance with the invention is highly resistant to both corrosion and abrasion. It thus acts as an anticorrosive and antiabrasion layer, which prevents any chemically or mechanically aggressive medium from coming into contact with the diaphragm material proper. The diaphragm itself can therefore be made from a conventional low-cost material which can be selected with regard to other requirements, such as elastic qualities and joining technique used.

For the anticorrosive and antiabrasion layer of silicon carbide, a thickness of about 1 to 10 $\mu$m is sufficient. Silicon-carbide layers of such a thickness can be formed quickly, at low cost, and with good reproducibility by coating the surface of the diaphragm with silicon carbide by chemical vapor deposition (CVD). This method has been known for some time and is especially suited for economical mass production. Since the deposition of silicon carbide by the CVD process takes place at temperatures of about 1000° C., this method is only suitable for coating diaphragm materials that can withstand this temperature, such as ceramics, quartz, single-crystal materials, and certain metals. Plasma enhanced chemical vapor deposition (PECVD), a method which became available only recently, makes it possible to deposit silicon carbide at much lower temperatures, namely about 100° to 200° C., so that it is also suitable for coating less heat-resistant materials, such as glass. If PECVD is used, the diaphragm may be coated after the parts have been assembled.

In any case, chemical vapor deposition results in silicon-carbide layers of high elasticity and low flexural rigidity which adhere well to all diaphragm materials and have no or only very low residual stresses. Reactions of silicon-carbide layer on the diaphragm are therefore negligible.

An essential advantage of the application of the silicon-carbide layer by chemical vapor deposition consists in the fact that a very dense coating is achieved on both smooth and very rough surfaces, so that the silicon-carbide layer is free of microcracks and imperfections. Thus, even the rough surfaces of ceramic diaphragms can be coated without first having to be polished.

As silicon carbide is a semiconductor, the silicon-carbide layer deposited on the diaphragm can be made electrically conductive by suitable doping. It can then additionally be used as an electrostatic shield.

Further advantageous aspects and developments of the invention are defined in the subclaims.

Further features and advantages of the invention will become apparent from the following description of an embodiment taken in conjunction with the accompanying drawing. The single FIGURE of the drawing shows a cross section through a pressure sensor in accordance with the invention.

DETAILED DESCRIPTION OF DRAWING

The pressure sensor 10 shown in the drawing has a diaphragm 11 in the form of a circular disk with plane-parallel surfaces which is joined around the periphery to a circular substrate 2 by a joining means 13. The joining means 13 holds the diaphragm 11 at a defined distance from the substrate 12, so that a chamber 14 is formed between the surfaces of the diaphragm 11 and the substrate 12 facing each other. The diaphragm 11 may be made of ceramic, glass, quartz, metal, or a single-crystal material, such as single-crystal silicon. The substrate 12 may also be of any of these materials, but the materials of the diaphragm 11 and the substrate 12 may differ. Preferred materials for the diaphragm 11 and the substrate 12 are oxide ceramics, particularly alumina ceramic. The joining means 13 is chosen to produce a permanent and tight joint both with the material of the diaphragm 11 and with the material of the substrate 12. The diaphragm 11 is elastic, so that it can deform when pressure is applied to it. The substrate 12 may be solid and rigid, but if desired, it may also be a flat elastic disk like the diaphragm 11.

Inside the chamber 14, those surfaces of the diaphragm 11 and the substrate 12 which face each other are provided with circular conductive metal layers 15 and 16, respectively, which are separated by a predetermined distance. The two conductive layers 15 and 16 constitute the electrodes of a capacitor whose capacitance depends on the distance between the conductive layers. They are connected by leads (not shown) to an electronic circuit which generates an electric measured-value signal that depends on the capacitance between the two electrodes 15 and 16.

In operation, the pressure sensor 10 is mounted so that only the surface of the diaphragm 11 facing away from the substrate 12 is exposed to a medium whose pressure is to be measured. The diaphragm 11 is deformed to a degree depending on the pressure of the medium, so that the distance between the conductive layers 15 and 16 and, hence, the capacitance of the pressure sensor 10 change. Thus, the measured-value signal generated by the electronic circuit connected to the pressure sensor is a measure of the pressure of the medium.

On the surface of the diaphragm 11 facing away from the substrate 12, i.e., the surface exposed to the medium whose pressure is to be measured, a thin layer 17 of silicon carbide (SiC) is deposited. The thickness of the layer 17 is about 1 to 10 $\mu$m. It is shown exaggerated for the sake of clarify.

The silicon-carbide layer is resistant to corrosion by acids, alkaline solutions, and solvents, mechanically hard, and resistant to abrasion. It therefore acts as an anticorrosive and antiabrasion layer against chemically or mechanically aggressive media. Thus, the pressure sensor 10 can also be used to measure the pressure of media which are chemically or mechanically aggressive, even if the diaphragm 11 is made of a material which is not resistant to such media.

A preferred method for depositing the silicon-carbide layer 17 is chemical vapor deposition (CVD), which is generally known. By this method, thin silicon-carbide layers can be deposited quickly, at low cost, and with good reproducibility. Since the deposition of silicon carbide by the normal CVD process must take place at a temperature of about 1000° C., this method is only suitable for coating diaphragms of a material which resists this temperature, such as ceramic, particularly oxide ceramic, single-crystal material, and certain steels. By plasma enhanced chemical vapor deposition (PECVD), however, silicon-carbide layers can be deposited at considerably lower temperatures of about 100° to 200° C. With the PECVD process, therefore, the anticorrosive and antiabrasion layer 17 can also be deposited on diaphragms of glass or other heat-sensitive materials.

Both with the CVD technique and with the PECVD technique, very firmly adhering and dense silicon-carbide layers without microcracks and imperfections are obtained on both smooth and very rough surfaces. Since unpolished ceramic surfaces are very rough, these processes are ideally suited for depositing the silicon-carbide layer 17 on a diaphragm 11 of ceramic without the surface to be coated having to be polished in a separate operation.

The silicon-carbide layer 17 deposited on the diaphragm 11 is characterized by high elasticity and low flexural rigidity, and it is virtually free of residual stresses. Its reaction on the diaphragm 11 is therefore negligible, so that the properties of the pressure sensor 10 are not impaired by the silicon-carbide layer 17.

If desired, the silicon-carbide layer 17 may be doped so as to be electrically conductive. It may then additionally serve as an electrostatic shield.

We claim:

1. Pressure sensor comprising a diaphragm which is joined around the periphery to a substrate so as to form a chamber, the diaphragm having an outermost surface facing away from the substrate and exposed to a medium whose pressure is to be measured, characterized in that a layer of silicon carbide is applied to the surface of the diaphragm as the outermost exposed surface facing away from the substrate.

2. A pressure sensor as claimed in claim 1, characterized in that the silicon-carbide layer is applied by chemical vapor deposition.

3. A pressure sensor as claimed in claim 1, characterized in that the silicon-carbide layer has a thickness of about 1 to 10 $\mu$m.

4. A pressure sensor as claimed in claim 1, characterized in that the silicon-carbide layer is made electrically conductive by doping.

5. A pressure sensor as claimed in any one of claims 1 to 4, characterized in that the diaphragm is made of ceramic.

6. A pressure sensor as claimed in claim 5, characterized in that the diaphragm is made of oxide ceramic.

7. A pressure sensor as claimed in claim 6, characterized in that the diaphragm is made of alumina ceramic.

8. A pressure sensor as claimed in claim 1, characterized in that the diaphragm is made of glass.

9. A pressure sensor as claimed in claim 1, characterized in that the diaphragm is made of quartz.

10. A pressure sensor as claimed in claim 1, characterized in that the diaphragm is made of a single-crystal material.

11. A pressure sensor as claimed in claim 10, characterized in that the diaphragm is made of single-crystal silicon.

12. A pressure sensor as claimed in claim 1, characterized in that the diaphragm is made of metal.

13. A pressure sensor comprising
a substrate,
a diaphragm coupled to the substrate to define a chamber therebetween, the diaphragm including a first surface directed toward the substrate and a second surface facing away from the substrate, the second surface being exposed to a medium the pressure of which is to be measured, and
a single protective layer formed on the second surface of the diaphragm to protect the diaphragm from the medium, the single protective layer comprising a layer of crystalline silicon carbide.

14. The pressure sensor according to claim 13, wherein the silicon carbide layer is applied by chemical vapor deposition.

15. The pressure sensor of claim 13, wherein the silicon carbide layer has a thickness of about 1 to 10 $\mu$m.

16. The pressure sensor of claim 13, wherein the silicon carbide layer is made electrically conductive by doping.

* * * * *